United States Patent [19]
Eylman

[11] Patent Number: 5,055,733
[45] Date of Patent: Oct. 8, 1991

[54] METHOD FOR CONVERTING MICROMOTIONS INTO MACROMOTIONS AND APPARATUS FOR CARRYING OUT THE METHOD

[76] Inventor: Leonid Eylman, P.O. Box 591013, San Francisco, Calif. 94159-1013

[21] Appl. No.: 583,607

[22] Filed: Sep. 17, 1990

[51] Int. Cl.⁵ .......................................... H01L 41/08
[52] U.S. Cl. ................................... 310/328; 310/339
[58] Field of Search ................................ 310/328, 339

[56] References Cited

U.S. PATENT DOCUMENTS

| | | | |
|---|---|---|---|
| 3,501,099 | 1/1970 | Benson | 310/328 |
| 4,567,394 | 1/1986 | Frisch | 310/328 |
| 4,690,465 | 9/1987 | Takeda et al. | 310/328 |
| 4,765,140 | 8/1988 | Imoto et al. | 310/328 |
| 4,803,393 | 2/1989 | Takahashi | 310/328 |
| 4,825,685 | 5/1989 | Breimesser | 310/328 |
| 4,843,951 | 2/1989 | Brüggen et al. | 310/339 |
| 4,909,440 | 3/1990 | Mitsuyasu et al. | 310/328 |
| 4,958,101 | 9/1990 | Takahashi et al. | 310/328 |
| 4,983,876 | 1/1991 | Nakamura et al. | 310/328 |
| 4,995,587 | 2/1991 | Alexius | 310/328 |

FOREIGN PATENT DOCUMENTS

| | | | |
|---|---|---|---|
| 0189629 | 8/1986 | Japan | 310/339 |
| 0256679 | 11/1986 | Japan | 310/339 |
| 2087659 | 9/1981 | United Kingdom | 310/328 |

Primary Examiner—Mark O. Budd
Assistant Examiner—Thomas M. Dougherty

[57] ABSTRACT

A method for converting micromotions into macromotions by providing a plurality of piezoelectric members (82) having surface areas sufficient to change the volume of the piezoelectric members (82) macroscopically when their lengths are changed microscopically. The members (82) are located in a sealed chamber (30) filled with an incompressible dielectric liquid (31). When the piezoelectric members are increased in their volume under the effect of an electric current, this variation of volume is transmitted through the incompressible liquid (31) to a small-diameter piston rod (46) which is made integrally with a piston head (34) of a substantially greater diameter. The piston head (34) is located in a hydraulic cylinder of a hydraulic multiplicator which transmits the pressure developed in a chamber (28) of the hydraulic multiplicator to a piston (76). This piston is connected to a working tool, so that when the piezoelectric members (82) increase in their lengths microscopically, this microscopic increase in length is converted into a macroscopic increase in volume of the piezoelectric members which via the incompressible liquid (31) displace piston rod (46) for a substantial length which is further increased by the hydraulic amplifier and is transmitted to the working tool. An apparatus for carrying out the above-described method is made in the form of a hermetically sealed housing (22) divided into a first chamber (28) and a second chamber (30). The second chamber is filled with the incompressible liquid and contains the above-mentioned piezoelectric members (82), while the first chamber (28) forms a part of the above-mentioned hydraulic amplifier.

11 Claims, 6 Drawing Sheets

METHOD FOR CONVERTING MICROMOTIONS INTO MACROMOTIONS AND APPARATUS FOR CARRYING OUT THE METHOD

BACKGROUND

1. Field of the Invention

The present invention relates to the field of energy conversion, particularly to conversion of thermal or electric microphenomena into macroscopic mechanical movements. The invention also relates to apparatus for carrying out the method.

2. Description of the Prior Art

Roughly, all physical phenomena can be divided into microscopic and macroscopic. In the context of the present invention, the term "microscopic phenomenon or movement" means the one which cannot be seen with the naked eye, whereas the term "macroscopic" relates to those phenomena and movements which can be seen with the naked eye. In the context of the present invention, macroscopic phenomena are those which are on the order of millimeters and kilograms, or greater values, whereas microscopic phenomena are those which are on the order of fractions of millimeters and grams, or smaller values, respectively.

Conventional prime movers, such as a.c. synchronous and asynchronous rotary electric motors, as well as d.c. motors used in various fields of industry operate on the principle of macrophenomena, such as rotation caused by interaction of electromagnetic fields of rotors and stators having windings. When the rotor and stator of such an electric motor are unrolled into planes, the motor is transformed into the so-called linear motor (Svecharnik, D. V. Linear Electric Drive [*Lineiny Electroprivod*], Energiya Publishers, Moscow, 1979). Other examples of application of macromovements are internal combustion engines, steam engines, etc.

However, the conventional prime movers operating on the principle of macrophenomena, i.e., rotary and linear electric motors, have the following common disadvantages: momentum of inertia during reversion of movement, considerable weight per unit power, difficulty in manufacturing, high cost of materials, inability of stopping in an accurate position caused by inevitable gaps and plays in the units of the electric motor and its reducer, if such is available, active and induction energy losses, etc. A disadvantage inherent specifically in linear motors is additional loss of energy associated with an open-loop nature of the magnetic circuit.

On the other hand, devices based on the use of microphenomena can be used only for microscopic movements, such as microscopic movements of phono stylus which are converted into electric signals in a record player, vibratory pumps, electromechanical actuators of control systems, etc. However, devices which operate on the principle of microphenomena, cannot be used as drive means or prime movers for macroscopic displacements.

Attempts have been made heretofore to solve above problems by converting micromovements into macromovements by means of special conversion devices.

An example of such a conversion device is a stacked piezoelectric ceramic displacement magnifying device described in U.S. Pat. No. 3,501,099 issued in 1970 to G. Benson. Benson shows two chambers, one which has a plurality of electroexpansive elements which may consist of piezoelectric material. The electroexpanisve elements increase their volume on reception of a high voltage signal. The chamber with electroexpansive elements contains an incompressible fluid. That chamber is sealed. In operation, the electroexpansive elements expand, which causes a volume change in the incompressible liquid and a volume change in the chamber which is at the broad surface of the piston. The volume change in the chamber in which the broad surface of the piston resides is greater than the volume change of the piezoelectric element, and therefore this change (the former of the two) functions as the multiplication means. The Benson device has means for protecting electroexpansive elements from an external load.

However, the Benson device is designed for carrying out only micromotions and, although theoretically it can work as a motion multiplicator, it is unsuitable for converting micromotions with such multiplicator rations which allow macromotions to be obtained.

This is because the initial volume of the electroexpansive elements of the Benson device which are contained in the incompressible liquid is extremely small, so that when such initial volume is multiplied, even by 100 times, the resulting multiplied volume still remains small. The reason is that by their nature the electroexpansive elements of the Benson device do not have a sufficiently developed surface perpendicular to the direction of expansion and therefore the volume of the chamber cannot be significantly increased.

Furthermore, the Benson device is based on the use of piezoceramic materials such as oxides of lead, titanium, and zirconium. It is known, however, that these materials lose their property of electroexpansion at pressures exceeding 15 kg/mm$^2$. This means that, even at a volume multiplication factor of 100, the effective force should apply to such elements a pressure not exceeding 0.15 kg/mm$^2$. Thus, the Benson the device cannot function as a power unit and cannot carry out work.

The electroexpansive elements of the Benson device comprise a stack of separate piezoceramic element utilizing an accumulated effect of expansion. In such a device, each element must be mechanically treated before assembly. This is because the piezoceramic element has a surface layer which absorbs a considerable portion of microdeformations, and this layer has to be removed. Furthermore, for strengthening the stack of elements must be bandaged.

The Benson has a protective device rather than an unloading device. This protective device shuts off the system when the load exceeds a predetermined load. This means that if the piezoceramic elements experience a high load, the device will be switched off rather than being unloaded and continuing to operate. The unloading system is needed in order to increase the power capacities of the device.

OBJECTS AND ADVANTAGES OF THE INVENTION

It is an object of the present invention to provide a method and apparatus for converting microscopic movements into macroscopic motion with a power capable of performing mechanical work. Another object is to provide a method and apparatus for converting microscopic movements of microscopically changeable elements into macroscopic displacements of a liquid surrounding such elements in a closed space. Another object of the invention is to provide an apparatus of the above-mentioned type which can convert microscopic movements into essential linear or rotary motions comparable with those developed by conventional electric rotary or linear prime movers. Still another object of the invention is to provide an apparatus of the above-mentioned type which has low momentum of inertia during reversion of movement, low weight per unit power, is simple in construction, inexpensive to manufacture, uses low-cost materials, is capable of stopping in an accurate position, and has low energy losses. Further objects and advantages will become apparent after consideration of the ensuing description and the accompanying drawings.

Reference Numerals Used in the Description and Drawings

| | |
|---|---|
| 20 - | apparatus of the invention |
| 22 - | housing |
| 24 - | first cover |
| 26 - | second cover |
| 28 - | first chamber |
| 30 - | second chamber |
| 31 - | dielectric liquid |
| 32 - | transverse partition |
| 34 - | piston |
| 36 - | upper chamber |
| 38 - | liquid |
| 40 - | lower chamber |
| 42 - | central hub |
| 44 - | opening |
| 46 - | piston rod |
| 48 - | through opening |
| 50 - | solenoid valve |
| 52 - | tube |
| 54 - | space |
| 54a - | liquid |
| 56 - | reinforcement perforated sleeve |
| 58, 60 - | extensions |
| 62 - | lower end of face of the piston |
| 64, 66 - | openings |
| 68, 70 - | guide rods |
| 72 - | power cylinder |
| 74 - | cylinder housing |
| 75 - | lower end of piston rod |
| 76 - | working piston |
| 77 - | seal rings |
| 78 - | piston rod |
| 79 - | upper pneumatic chamber |
| 79a - | lower pneumatic chamber |
| 80 - | conversion unit |
| 82a, 82b - | piezoelectric plates |
| 84 - | inner surface of partition |
| 85 - | bleeding hole |
| 86, 88 - | recesses |
| 90, 92 - | resilient pads |

-continued

Reference Numerals Used in the Description and Drawings

| | |
|---|---|
| 94, 96 - | electrodes |
| 98, 100 - | external terminals |
| 131 - | liquid |
| 200 - | apparatus of the invention |
| 300, 400, 500 - | cartridges |
| 302 - | inner casing |
| 304 - | outer casing |
| 306 - | seal ring |
| 307 - | sealed chamber |
| 308a, 308b, 308c - | piezoelectric column |
| 310 - | piezoceramic element |
| 312 - | bottom of inner casing |
| 314 - | bottom of outer casing |
| 316, 318 - | springs |
| 320 - | outer end face of the inner casing |
| 322 - | inner end face of the outer casing |
| 324, 326 - | wedge-like seats |
| 328, 330 - | prismatic blocks |
| 332, 334 - | screws |
| 402 - | outer casing |
| 404 - | inner casing |
| 406 - | seal rings |
| 408 - | sealed chamber |
| 410 - | liquid |
| 412 - | annular piston |
| 414 - | annular slot |
| 415 - | external surface of bottom wall |
| 416 - | bottom wall of inner casing |
| 420 - | piezoceramic column |
| 422 - | telescopic covering |
| 424 - | external surface of inner casing 404 |
| 426 - | external surface of annular piston 412 |
| 502 - | outer casing |
| 504 - | inner casing |
| 506 - | sealed space |
| 508 - | bottom wall of inner casing |
| 510 - | cup shaped housing |
| 512 - | main cylinder |
| 514, 516 - | peripheral cylinders |
| 518 - | main piston |
| 520 - | piezoceramic piston rod |
| 522 - | rigid connection |
| 524, 526 - | pistons |
| 528, 530 - | piston rods |
| 532, 534 - | camming elements |
| 536, 538 - | ports |
| 540, 542 - | solenoid valves |
| 544 - | wall of the inner casing |
| 546, 548 - | radial stands |
| 550, 552 - | gear wheels |
| 554 - | central gear wheel |
| 556, 558 - | threaded openings |
| 560, 562 - | threaded pins |
| 564 - | camming surface |
| 566 - | piezoceramic body |
| 568 - | ferrule |
| 570, 572 - | electrodes |
| 576 - | lead wires |
| A, B - | direction of expansion of the piezoceramic element |

DETAILED DESCRIPTION OF THE INVENTION

Figure 1:
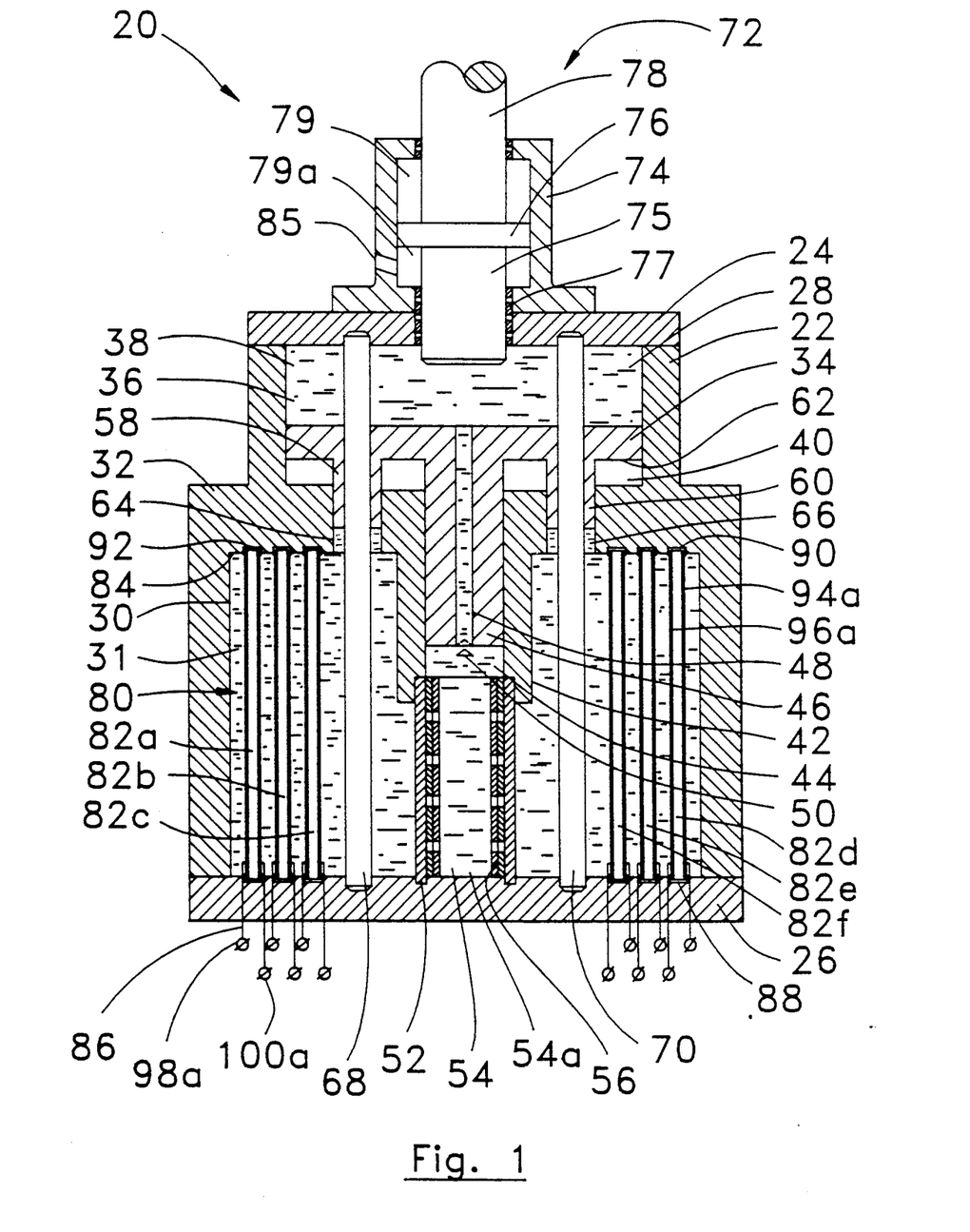
FIG. 1 is a longitudinal sectional view of an apparatus of the invention in the form of a linear prime mover for the conversion of microscopic movements of piezo elements into macroscopic linear displacement of a piston capable of performing a mechanical work.

FIG. 1—An Embodiment of an apparatus in the form of a linear prime mover for the conversion of microscopic movements of piezo elements into macroscopic linear displacement of a piston capable of performing a mechanical work FIG. 1 is a longitudinal sectional view of an apparatus of the invention in the form of a linear prime mover for the conversion of microscopic movements of piezo elements into macroscopic linear displacement of a piston capable of performing a mechanical work.

The apparatus, which is generally designated by reference numeral 20, consists of a housing 22 which is sealingly closed at one end by a first cover 24 and at another end by a second cover 26. Covers 24 and 26 are attached to housing 22 by bolts, which are not shown in the drawings. It is understood that appropriate seals, which also are not shown in the drawings, are placed between respective covers and housing 22. Housing 22 is divided into two chambers, i.e., a first chamber 28 and a second chamber 30, by a transverse partition 32. First chamber 28 is preferably of a cylindrical shape and contains a piston 34 slidingly moveable in chamber 28 and dividing it into an upper chamber 36, which is filled with a liquid 38, and a lower chamber 40 which is sealed from liquid 38 by a piston head or piston 34 of a substantial diameter. It is understood that the terms "upper" and "lower" are conventional and that the apparatus may have different orientation than the one shown in FIG. 1.

Second chamber 30 is filled with a dielectric liquid 31 such as a transformer oil.

Partition 32 has a central hub 42 with an opening 44 which slidingly receives a piston rod 46 of piston 34. A through opening 48 passes through the central part of piston 34. A valve, e.g., an electrically controlled solenoid valve 50, is installed at the end of opening 48 opposite to the piston. Valve 50 can open or close the above-mentioned through opening 48 from an external command.

A tube 52 made of a relatively resilient material, such as bronze, spring steel or the like, is installed between the lower end of central hub 42 and the inner surface of second cover 26. A space 54 formed underneath piston rod 46 inside tube 52 is filled with liquid 54a and is isolated from the rest of second chamber 30. A reinforcement perforated sleeve 56 is located inside tube 52 in order to restrict its inward motion under the effect of pressure developed in second chamber 30, as will be described later.

Extensions or piston heads 58 and 60 of a diameter substantially smaller than that of piston 34 protrude downward from the lower end face 62 of piston 34. Extensions 58 and 60 are slidingly fitted in openings 64 and 66 of partition 32. For stability of extensions 58 and 60 during their axial motion, they can be guided by guide rods 68 and 70 which pass through openings 64 and 66 and are rigidly fixed in the housing between first cover 24 and second cove 26.

First cover 24 can be connected to a pneumatic power cylinder 72 which consists of a cylinder housing 74 rigidly attached to first cover 24 by bolts (not shown) and a working piston 76 with a piston rod 78. A lower end 75 of the piston rod of working piston 76 extends into upper chamber 36. Seal rings 77 are used for sealing liquid 38 of upper chamber 36 from the cavity of pneumatic cylinder 72.

Piston rod 78 can be connected to a tool, actuator or any other member (not shown in the drawings) designed to fulfil a mechanical work. Piston 76 divides cylinder house 74 into an upper pneumatic chamber 79 and a lower pneumatic chamber 79a. The latter is connected to the atmosphere via a bleeding hole 85.

Now an essential feature of the present invention, i.e., a piezoelectric conversion unit 80 will be described.

In the embodiment of FIG. 1, unit 80 consists of piezoelectric plates 82a through 82f arranged longitudinally between the inner surface 84 of partition 32 and inner surface of second cover 26. For stability, both ends of respective piezoelectric plates 82a through 82f can be inserted into recesses 86 and 88 made in partition 32 and second cover 26, respectively. In order not to complicate the drawing, only two such recesses are designated by reference numerals 86 and 88. Piezoelectric plates 82a through 82f can be made of a piezocrystals or piezoceramic, such as those described in Entziklopediya Neorganicheskikh Materialov (Encyclopedia of Inorganic Materials, Vol. 2, Head Editors of the Ukrainian Soviet Encyclopedia, Kiev, 1977, p. 268). Since these materials are brittle, resilient pads 90 are placed onto the bottoms of respective recesses 86.

Electrodes 94 and 96 are applied to opposite side surfaces of each piezoelectric plate (82a through 82f). Each electrode is electrically connected to external terminal 98 and 100. In order not to complicate the drawing, only two electrodes, i.e., 94 and 96, and only two external terminals, i.e., 98 and 100, are designated with reference numerals. It is understood, however, that each piezoelectric plate has a pair of electrodes connected to a pair of respective external terminals, i.e., the device has electrodes 94a through 94f and 96a through 96f, as well as external terminals 98a through 98f and 100a through 100f.

Although, depending on the orientation of crystallographic axes, piezoelectric elements can either expand or contract under the effect of electric current, plates 82a to 82f have crystallographic axes oriented so that the plates can only expand.

Operation of the Apparatus of FIG. 1

In operation, a high-voltage direct current is applied to electrodes 94a through 94f from an external d.c. source (not shown in the drawing) via external terminals 98a to 98f and 100a to 100f. Under the effect of electric current, piezoelectric plates 82a to 82f expand radially outwardly so that the volume occupied in second chamber 30 by liquid 31 is reduced, and the pressure of liquid 31 in second chamber 30 is increased. As a result, the pressure applied to piston extensions 60 also increases and pushes these extensions and, hence 34 in an upward direction. During its motion, piston 34 over guide rods 68 and 70. The upward movement of piston 34 compresses liquid 38 in upper chamber 36. The of this liquid is applied to the lower end 75 of piston rod of working piston 76. As a result, piston 76 and its piston rod 78 are moved in the upward direction together with a working tool (not shown) which is attached to the upper end of piston 78.

Upon completion of the working stroke, piston 76 hence, the working tool are returned to the initial position by air compressed in upper pneumatic chamber 79.

The following will explain how apparatus 20 of the converts microscopic movements (in the order of microns) of piezoelectric plates into macroscopic movements (in the order of dozens of centimeters) of the working tool.

When high-voltage d.c. current is applied to electrodes 94 and 96 of piezoelectric plates 82a and 82b, their volume is increased by several cubic millimeters. Since second chamber 30 contains a plurality of conversion units 80, an increase in the volume of each unit is multiplied by the number of such units. For example, six conversion units 80 are shown in the illustrated embodiment (FIG. 1). Therefore, the total decrease in the volume of liquid 31 in second chamber 30 will correspond to sixfold increase in the volume of elementary conversion unit 80. However, piston 34 has a diameter several times greater than that of extensions 58 and 60, so that a coefficient of multiplication of displaced liquids, which is a ratio of cross-sectional area of piston 34 to total cross-sectional area of extensions 58 and 60, may be in terms of hundreds or thousands. For example, in case piezoelectric plates 82a and 82b have dimensions of 10×50×100 mm, are made of a piezoelectric material such as an artificial crystal of dislocation-free quartz having a piezo module of about $10^{-9}$ m/V, and operate with a d.c. voltage equal to $10^6$ V, each plate will have a linear expansion of about $10^{-4}$ m (0.01 mm). Taking into account the dimensions of each plate, its volume can be increased by 50 mm$^3$. In case ten such plates are used, the total increase in volume will be equal to 500 mm. This is the initial volume for multiplication. With the cross-sectional area of both extensions 58 and 60 equal to 100 mm$^2$ and the cross-sectional area of piston 34 equal to 10,000 mm$^2$, the displaced volume of liquid 38 in first chamber 28 (with a 5 mm stroke of extensions 58 and 60) will be equal to 50,000 mm$^3$. In other words, changes in the volume of plates 82a through 82f increases the volume of liquid 38 in first chamber 28 by 100 times. In fact, extensions 58 and 60 function as multiplicator means which can multiply changes in the volume of one hydraulic chamber into 10 to 100 times greater changes in the volume of another chamber. Extensions 58 and 60 are rigidly connected to piston rod 46, the cross-sectional area of which is always smaller than the cross-sectional area of piston 34. Piston rod 46 is an element of the unloading system, which significantly lowers the pressure in the second chamber 30. In case piston rod 78 has a cross-sectional area of 50 mm$^2$, its axial displacement together with the working tool will be equal to 1000 mm (1 m), and the working tool will develop a force of 50 kg, provided the piezoceramic material (which is the weakest point of the system) can withstand 100 kg/mm$^2$.

When the apparatus is maintained under load, solenoid valve 50 is closed, so that through opening 48 of piston 34 is closed and the load is not transmitted to piezoelectric plates 82a and 82b, but is received by the column of liquid 54 in a closed space within tube 52. As tube 52 is made of a resilient material such as bronze, it expands radially outward, so that the volume of liquid 31 in chamber 30 is increased at the expense of resilient tube 52, rather then piezoelectric plates 82a and 82b. In other words, the piezoelectric loads are unloaded, and the load is taken by liquid 54 and tube 52. Deformation of tube 52 in the inward direction is limited by reinforcement perforated sleeve 56.

Although piezoelectric units 80 were shown in FIG. 1 in vertical positions, it is understood by those skilled in the art that they may have a horizontal or inclined positions without the departure from the principle of the present invention.

Thus it has been shown that apparatus 20 of the invention converts microscopical movements of piezoelectric plates 82a and 82b into macroscopic movements of piston rod 78.

Figure 2:
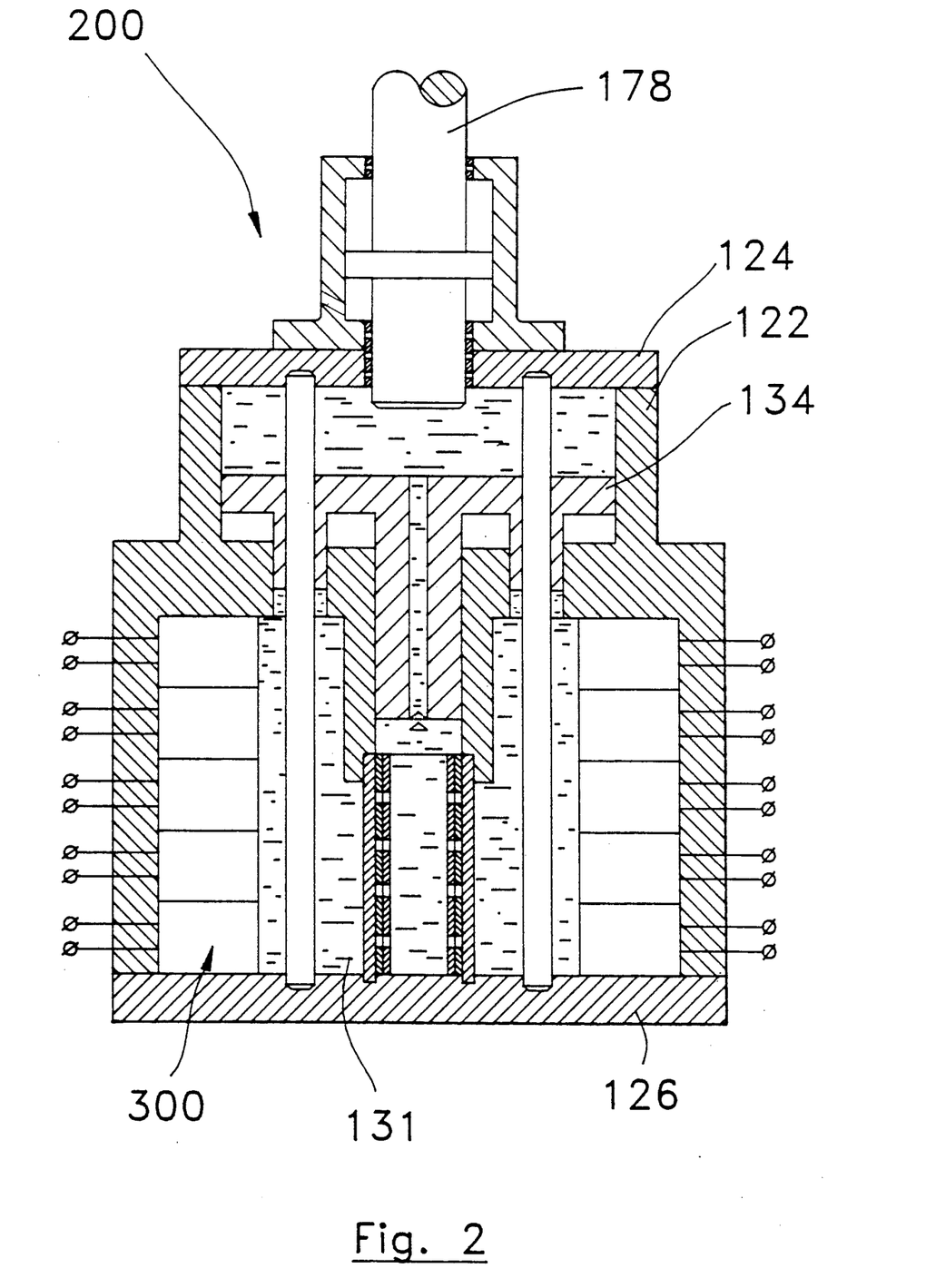
FIG. 2 is a view similar to one shown in FIG. 1, but with piezo elements arranged in cartridges.

FIGS. 2 to 6—An Embodiment of an apparatus with piezoelectric elements arranged in cartridges FIG. 2 is a view of an apparatus 200 similar to apparatus 20 shown in FIG. 1, but with piezo elements arranged in cartridges. Elements and parts which are identical with those of the embodiment of FIG. 1 will be designated by the same reference numerals, but with addition of 100. For example, piston 34 of FIG. 1 will corresponds to piston 134 in FIG. 2, etc. Since in both embodiments the identical parts operate in the same manner, in the second embodiment their description will be omitted.

It is shown in FIG. 2 that each piezoelectric unit is made in the form of a replaceable cartridge 300. Eight such cartridges 300 are shown in the embodiment of FIG. 2. These cartridges may have different constructions, examples of which are shown in FIGS. 3, 4, 5, 6, and 7 and will be described and considered separately. What is common for all cartridges is that each cartridge is a self-contained unit with a sealed interior.

Since all the remaining parts of apparatus 200 of the second embodiment of the invention (FIG. 3) operate in the same manner as respective parts of apparatus 20 and since each cartridge 300, 400, and 500 (FIGS. 3 through 5) functions as conversion element 80 of apparatus 20, the operation of the above-mentioned parts and each cartridge as a whole will be omitted. Consideration will be given only to the construction and interaction of the internal parts of each cartridge. This is because similar to element 80 the function of each cartridge is to merely increase its volume and thus to develop a pressure in liquid 131. Since, as will be shown below, each cartridge is a sealed unit, liquid 131 is not necessarily a dielectric liquid.

Figure 3:
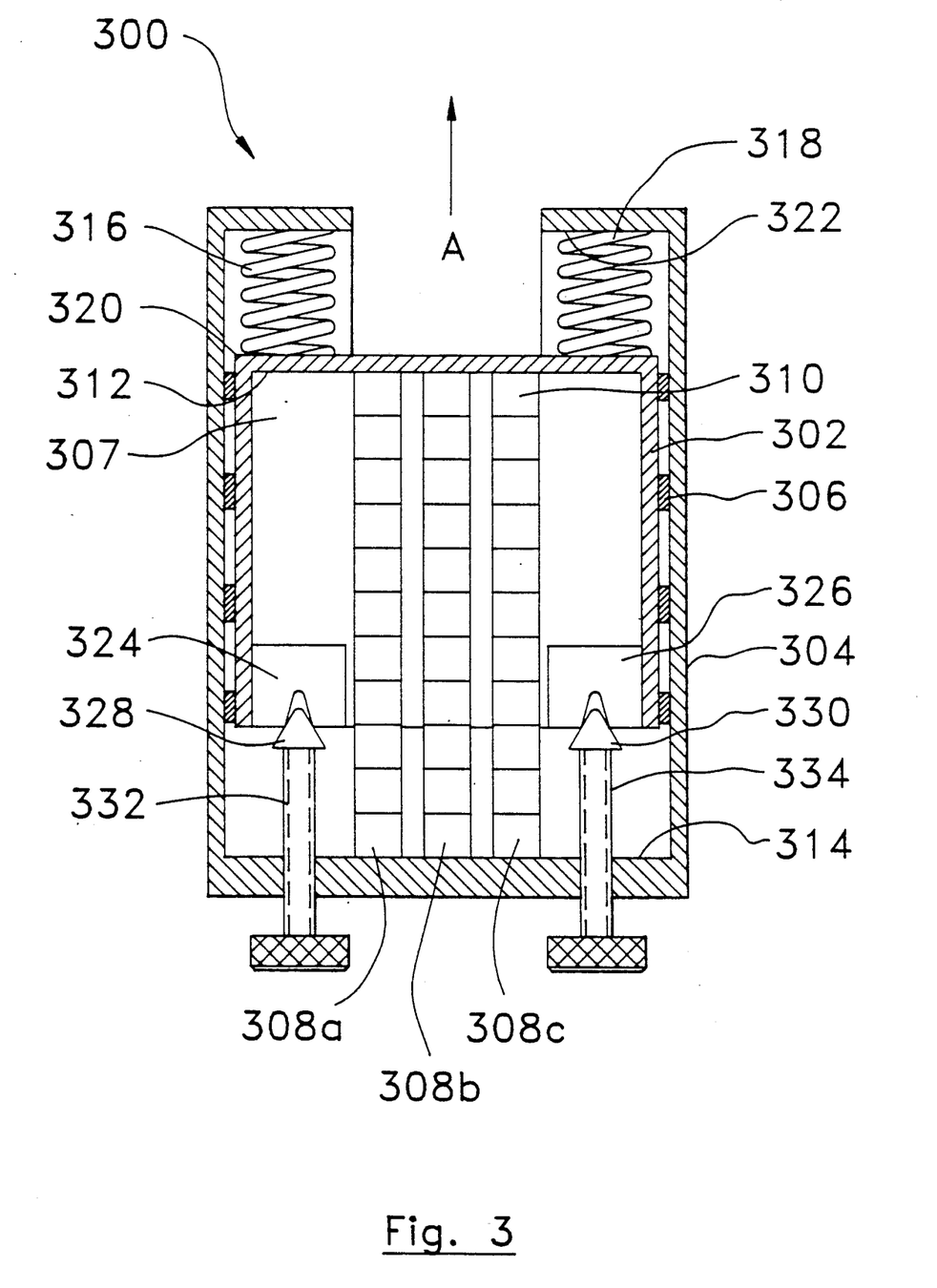
FIG. 3 is a sectional view of a piezoelectric cartridge used in the apparatus of FIG. 2 and designed for operation from direct current.

FIG. 3 is a sectional view of a piezoelectric cartridge 300 used in the apparatus of FIG. 2 and designed for operation from direct current.

Cartridge 300 consists of an inner casing 302 telescopically and sealingly fitted into an outer casing 304. Seal rings 306 can be placed between inner casing 302 and outer casing 304. As shown in FIG. 3, both casings have cup-shaped configurations (or boxlike configurations with each box being open from one side) with cups or boxes inserted one into another with their bottoms facing outward so that they form a sealed chamber 307. Inner casing 302 contains a number, e.g., three piezoceramic columns 308a, 308b, and 308c. Each such column is composed of a plurality of piezoceramic elements 310 arranged in series and forming the above-mentioned column. The construction and manufacture of each such element will be described later in connection with FIG. 6 and after consideration of each embodiment of the cartridge.

Each column is compressed between facing bottoms 312 and 314 of inner casing 302 and outer casing 304, respectively, under the effect of expansion springs 316 and 318 located between the outer end face 320 of inner casing 302 and inner surface 322 of outer casing 304 opposite to bottom 314.

In order to unload piezoceramic columns 308a, 308b, and 308c from external loads, cartridge 300 is provided with an unloading mechanism which consist of wedge-like seats 324 and 326, which are attached to inner casing 302, and prismatic blocks 328 and 330. Blocks 328 and 330 engage respective seats 324 and 326 and are maintained in tight contact with the latter by screws 332 and 334 threaded into the bottom wall of outer casing 304.

When high-voltage d.c. current is applied to electrodes (not shown) of piezoceramic columns 308a, 308b, and 308c, they expand linearly and thus push inner casing 302 telescopically with respect to outer casing in the direction of arrow A. Since outer end face 320 of inner element 302 is in contact with liquid 131, the pressure in this liquid will be decreased, and the sequence of operations described in connection with the embodiment of FIG. 1 will be repeated.

Figure 4:
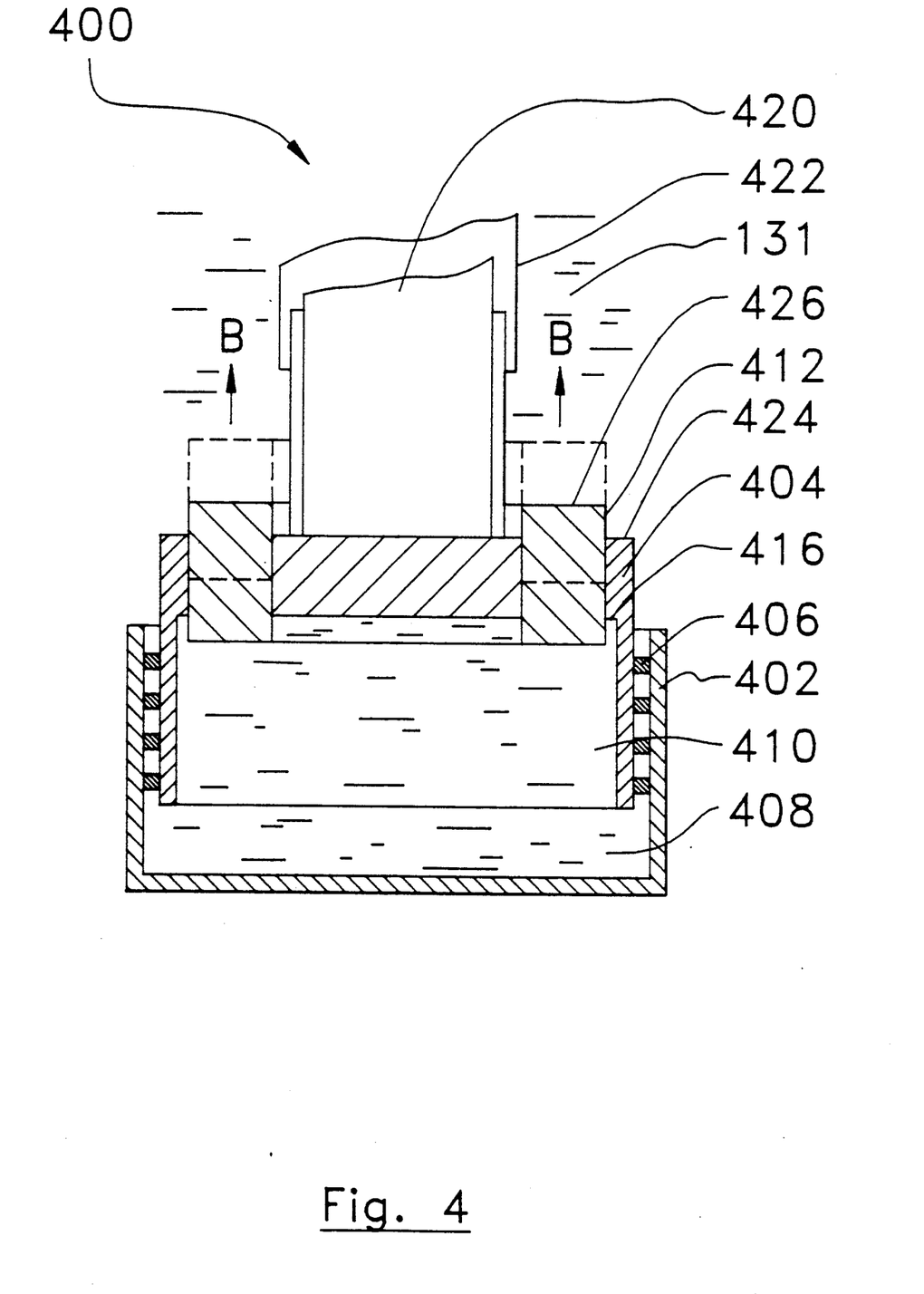
FIG. 4 is a sectional view of a piezoelectric cartridge used in the apparatus of FIG. 2 and designed for operation from alternating current.

FIG. 4 is a sectional view of a piezoelectric cartridge 400 used in the apparatus of FIG. 2 and designed for operation from alternating current.

Cartridge 400 has a stationary outer casing 402 and an inner casing 404 telescopically fitted in outer casing 402. Seal rings 406 are placed between the mating side surfaces of both casings. Similar to the embodiment of FIG. 3, both casings form a sealed chamber 408 which is filled with liquid 410, e.g., water. An annular piston 412 is sealingly inserted into an annular slot formed in a bottom wall 416 of inner casing 404. A piezoceramic column 420 of the type shown in FIG. 3 (308a, 308b, 308c) is rigidly connected to the external surface 415 of bottom wall 416. If liquid 131 is a non-dielectric liquid, piezoceramic column 420 has to be sealed in a telescopically expandable and contractible covering which is generally designated by reference numeral 422 (FIG. 4). Reference numeral 424 designates an external surface of inner casing 404 which is exposed to liquid 131, and reference numeral 426 designates an external surface of annular piston 412 exposed to the same liquid 131.

It is understood that the piezoceramic column is connected to an a.c. current source through respective electrodes (not shown).

In operation, application of a.c. current to piezoceramic column 420 will cause its cyclic expansion and contraction. When column 420 expands, it compresses liquid 410 in chamber 408, whereby annular piston 412 is pushed out in the direction of arrows B and into position indicated by broken lines. When at the next moment the column contracts, it will carry inner casing 404, which is rigidly connected thereto at its bottom, in the direction of the same arrow B. With the next expansion and contraction cycle, the operation will be repeated. As a result, inner casing 404 and ring piston 412, will perform translatory motion in the same direction, i.e., in the direction of arrow B. In order to provide uniformity of step-like motions of inner casing 404 and, hence, piston rod 178, the volume of liquid 131 displaced by external surfaces 426 of annular piston 412 should be equal to the volume of liquid 131 displaced by the external surface 424 of moveable inner casing 404.

In case unit 400 works in an electric-motor mode, surface 426 should be smaller than surface 424, while in case the unit works in a generator mode, surface 426 should be greater than surface 424.

Figure 5:
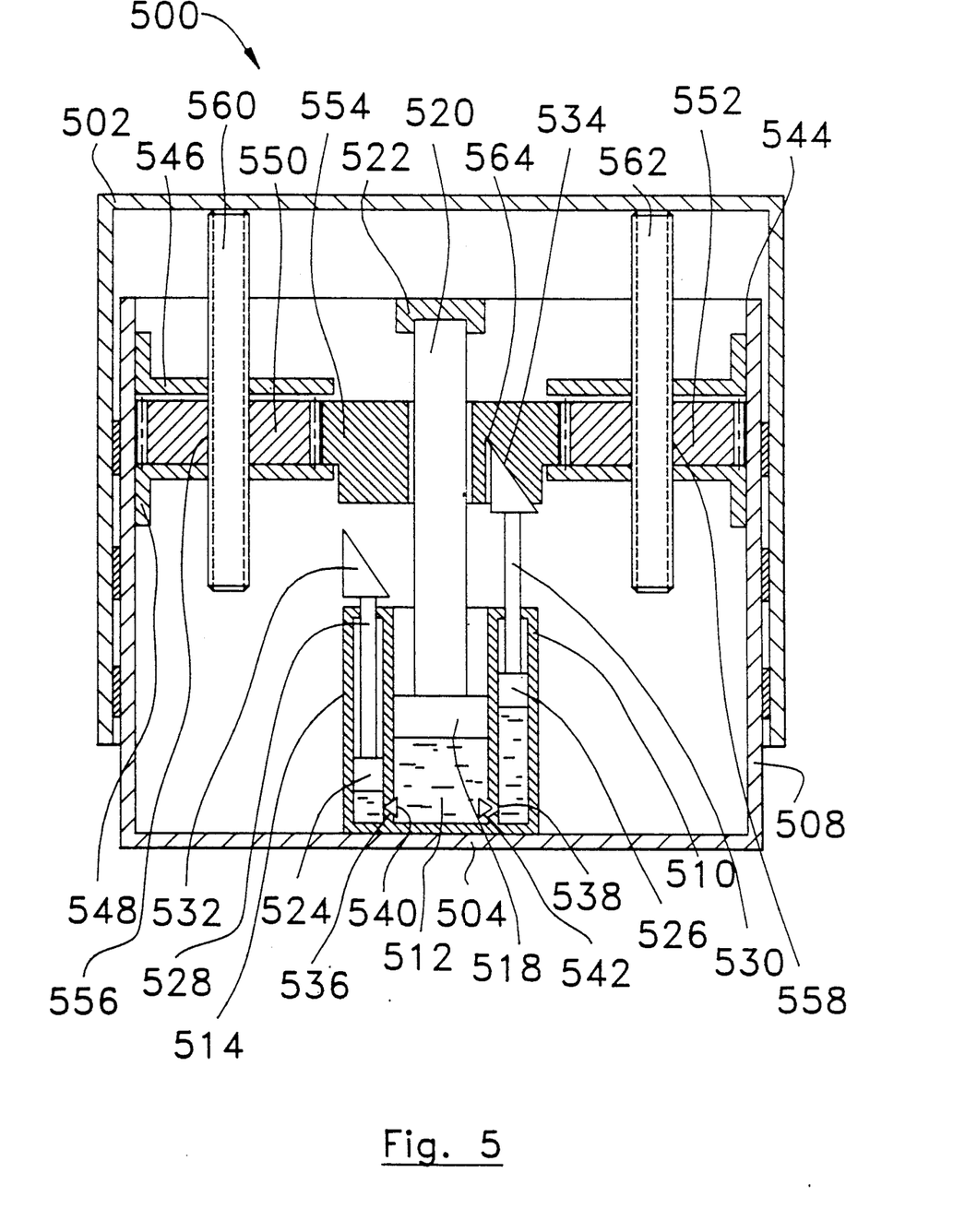
FIG. 5 is a sectional view of a piezoelectric cartridge with a hydraulic multiplicator and a camming mechanism.

FIG. 5 is a sectional view of a piezoelectric cartridge 500 with a hydraulic multiplicator and a camming mechanism. Similar to all previous embodiments, cartridge 500 consists of two telescopically connected casings, i.e., an outer casing 502 and an inner casing 504 which define a closed and sealed space. Outer casing 502 is moveable and inner casing 504 is stationary. Connected to the inner surface of bottom wall 508 is a cup-shaped housing 510 which has a centrally arranged main cylinder 512 and a number of peripheral cylinders 514 and 516. Although only two such peripheral cylinders are shown in FIG. 5, it is understood that a greater number of such peripheral cylinders can be uniformly spaced and arranged circumferentially around main cylinder 512. A main piston 518 is slidingly fitted in main cylinder 512 and its piston rod 520 is made of a piezoceramic material. The lower end of piston rod 520 is rigidly connected to main piston 518, while the upper end of piston rod 520 is rigidly connected to inner casing 504 at 522.

Each peripheral cylinder (514, 516) receives an auxiliary piston (524, 526) having a piston rod 528 and 530.

Each piston rod carried on its free end a camming or wedging element (532, 534). Chamber of peripheral cylinders 514 formed beneath pistons 524 and 526 are connected to the chambers formed in main cylinder 512 beneath main cylinder 518 via ports 536 and 538 which can be closed or opened by solenoid valves 540 and 542. These valves are can be remotely controlled from an external source, or a program device (not shown in FIG. 5), so that peripheral cylinders 514 and 516 can operate sequentially.

Attached to an inner side wall 544 of inner casing 504 are stands 546 and 548 which extend radially inwardly into the cavity of inner casing 504. Stands 546 and 548 rotatingly supports gear wheels 550 and 552 which are in mesh with a central gear wheel 554. The latter also is supported by stands 546 and 548 so that it can freely rotate but is protected by the above-mentioned stands from axial displacement. Central gear wheel 554 has a central hole 556 to provide unobstructed passage of piezoceramic piston rod 520. Each gear wheel 550 and 552 has a threaded opening 556 and 558, respectively, which engages a thread pin 560 and 562.

On the side which faces piston rods 528 and 530, central gear wheel 554 has a camming surface 564 which engages the above-mentioned camming elements 532 and 534 on piston rods 528 and 530.

When a high-voltage d.c. current is applied to piezoceramic piston rod 520, the latter linearly expands for a microscopic value. However, as main piston 518 has a large surface area, this microscopic motion is multiplied into macroscopic displacements of pistons 524 and 526 which have much smaller surface areas. Communication between main cylinder 512 and peripheral cylinders 514 via valves 540 and 542 is controlled from the above-mentioned program device (not shown) so that piston rods 528 and 530 and, hence, camming elements 532 and 534 will be activated sequentially and thus will engage camming surface 564 of central gear wheel 554 with the same sequence. The profile of the camming surface is made so that this sequential engagement will cause uniform rotation of gear wheel 554. Since the latter is in mesh with gear wheels 550 and 552, rotation of these gears will cause axial displacement of threaded pins 560 and 562. These pins will contact the inner side of moveable outer casing 502 and will push it in the direction of expansion of cartridge 500. The rest of the operation is the same as in connection with the description of FIG. 2.

It is understood that under the control of the program device, the cartridge can be expanded or contracted in any sequence required by specific conditions.

Figure 6:
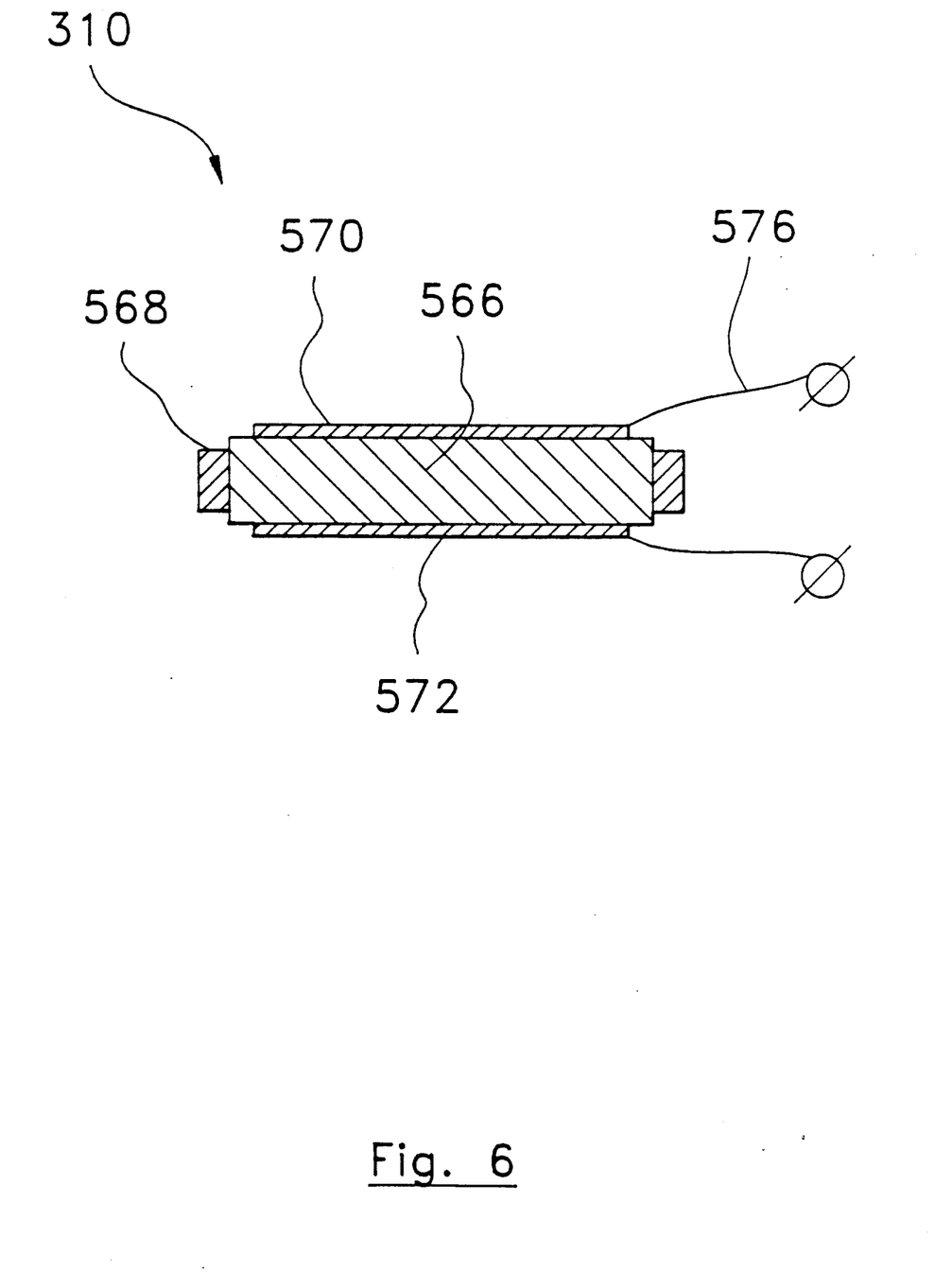
FIG. 6 is a sectional view of an elementary piezoceramic element used for assembling piezoceramic columns.

FIG. 6 is a sectional view of an elementary piezoceramic element 310 used for assembling piezoceramic columns employed in all the above-described embodiments. This element has a conventional construction [described, e.g., by I. A. Glozman in "Piezokeramika" (*Piezoceramics*), Moscow, "Energiya" Publishers, 1972] with the exception that a piezoceramic body 566 is press-fitted into a ferrule 568 made of a hard material, such as steel, and that after grinding the end faces of piezoceramic body 566 has to be polished to remove a friable layer formed as a result of grinding. This is important because microscopic linear expansions are absorbed by the above-mentioned friable layer. It is understood that after polishing, electrodes 570 and 572 are applied onto the polished surfaces of body 566, e.g., by vapor deposition in vacuum. Electrodes 570 and 572 are connected to lead wires 574 and 576 in a manner known in the art.

SUMMARY, RAMIFICATIONS, AND SCOPE

Thus it has been shown that the invention provides a method and apparatus for converting microscopic movements into a macroscopic motion with power capable of performing mechanical work. The apparatus has low momentum of inertia during reversion of movement, low weight per unit power, is simple in construction, inexpensive to manufacture, uses low-cost materials, is capable of stopping in an accurate position, and has low energy losses. Although the apparatus has been described and illustrated with reference to specific practical embodiments, it is understood that these embodiments were given only as examples and that many modifications of the device are possible. For example, the length of the linear expansions of piezoceramic elements can be increased by forming a piezoceramic column into a spiral body, or by sequentially connecting a series of mechanisms containing piezoelectric columns into a chain. The piezoceramic columns can be unloaded by various mechanisms such as wedging mechanisms. The shapes, materials, quantities, and dimensions of various parts and units of the apparatus can be different from those shown in the illustrated embodiments. Piezoceramic may be comprised of a piezosegnetic salt. It is also understood that magnetostrictive materials can be used instead of piezoceramics. The output element of the apparatus may have any configuration and can be connected to any known motion conversion mechanism, e.g., for the conversion of a linear motion to a rotary motion. It is also understood that cartridges can be expanded or contracted under the effect of heat energy, e.g., due to thermal expansion. Each unit or cartridge can operate in an electric-motor or a generator mode. Therefore the scope of the invention should be determined, not by the examples given, but by the appended claims and their legal equivalents.

I claim:
1. A method for converting micromotions into macromotions comprising the steps of:
   providing at least one member having a surface area sufficient to change the volume of said member macroscopically when the length of said member is changed microscopically;
   connecting said at least one member with a source of energy, which when supplied to said at least one member changes its volume;
   placing said at least one member into a sealed chamber filled with an incompressible liquid so that when said at least one member changes its volume, it displaces said incompressible liquid from said sealed chamber;
   connecting said sealed chamber with a hydraulic multiplicator means with a hydraulic chamber for multiplying said changes in the volume of said hydraulic chamber into 10 to 100 times greater changes in the volume of said multiplicator means;
   connecting said multiplicator with means for converting said greater volume changes of said multiplicator into movements of a working element capable of performing useful work;
   said at least one member is protected from external load from the side of said working element by an unloading means which operates when said member is expanded and is maintained in said expanded state, said at least one member being telescopically expandable and comprising a self-contained unit with a sealed interior.

2. The method of claim 1 wherein interior of said member contains an element, the length of which is changed linearly when energy is applied to said element.

3. The method of claim 2 wherein said liquid is a non-dielectric liquid.

4. The method of claim 2 wherein a plurality of said self-contained units are used in said sealed chamber.

5. An apparatus for converting micromotions into macromotions comprising:
   a hermetically sealed housing divided into a first chamber and a second chamber, said chambers being filled with an incompressible liquid;
   at least one member having a surface area sufficient to change the volume of said incompressible liquid macroscopically when the length of said member is changed microscopically, said at least one member being located in said second chamber;
   a hydraulic multiplicator in said first chamber for multiplying said changes in the volume of said incompressible liquid into 10 to 100 times greater changes in the volume of said first chamber, said hydraulic multiplicator having a sealed space having a piston with a piston rod and a piston extension rigidly connected to said piston rod, said piston extension being sealingly and slidingly inserted into said second chamber so that said changes in the volume of said incompressible liquid causing displacements of said piston extension, said sealed space above said piston being filled with a hydraulic liquid, said piston having surface area exposed to said hydraulic liquid 10 to 100 times greater than the surface area of said piston extension exposed to said incompressible liquid of said second chamber;
   a working element capable of performing useful work, a portion of said working element being sealingly and slidingly inserted into said space filled with said hydraulic liquid, while the opposite end of said working element extends outside said space;
   a source of energy, which when supplied to said at least one member changes the volume of said member;
   means for unloading said at least one member, said unloading means comprising a sealed chamber formed in said second chamber under said piston rod, said chamber under said piston rod being filled with a liquid which is sealingly isolated from said incompressible liquid of said second chamber by a tubular member made of a resilient material, said chamber under said piston rod having a reinforcement element which limits compression of said resilient element under the effect of pressure developed in said second chamber, so that when an external force is applied to said working element and is maintained on said working element, said liquid in said chamber under said piston rod receives said load and prevents it from being transmitted to said at least one member;
   said at least one member is telescopically expandable and comprises a self-contained unit with a sealed interior, said interior of said at least one member containing an element, the length of which changes linearly when energy is applied to said element.

6. The apparatus of claim 5 wherein said self-contained unit consists of an inner casing and an outer casing, each said casing having a boxlike shape with one end being open and another end being closed, said inner casing being telescopically and sealingly fitted into said outer casing with said open ends of said casings facing each other, so that a closed space is formed between both said casings, a number of piezoceramic columns being placed into said closed space, each said column being composed of a plurality of piezoceramic elements arranged in series, spring-loaded means being placed between said open end of said outer casing and said closed end of said inner casing, so that said columns are being constantly compressed between said both elements in said closed space, said units being further provided with means for unloading said piezoceramic columns, said unloading means comprising wedgelike seats attached to said inner casing and prismatic blocks attached to said external casing via adjustable members.

7. The apparatus of claim 5 wherein said self-contained unit consists of an outer casing and an inner casing telescopically and sealingly fitted into said outer casing.

8. The apparatus of claim 5 wherein said self-contained unit consists of an inner casing and an outer casing, each said casing having a boxlike shape with one end being open and another end being closed, said inner casing being telescopically and sealingly fitted into said outer casing with said open ends of said casings facing each other, so that a closed space is formed between both said casings, said closed space being filled with a liquid, a piezoceramic column being rigidly connected to said closed end of said inner casing from its external side, said closed end of said inner casing having an annular groove, an annular piston being sealingly and slidingly inserted into said annular groove, said outer casing being stationary, said inner casing being moveable with respect to said outer casing.

9. The apparatus of claim 8 wherein the volume of said liquid displaced in said space by said annular piston is equal to the volume of said incompressible liquid displaced by said inner casing in said second chamber.

10. The apparatus of claim 8 wherein said self-contained unit consists of an inner casing and an outer casing, each said casing having a boxlike shape with one end being open and another end being closed, said inner casing being telescopically and sealingly fitted into said outer casing with said open ends of said casings facing each other, so that a closed space is formed between both said casings, said outer casing being moveable and said inner casing being stationary, a cup-shaped housing being connected to said inner casing inside said space, said housing having a centrally arranged main cylinder and a number of peripheral cylinders, said center cylinder and said peripheral cylinders being filled with a hydraulic liquid, being hydraulically connected to each other, said central cylinder containing a central piston, said peripheral cylinders containing auxiliary pistons, said central piston being connected to a piston rod made of a piezoceramic material, the end of said piston rod opposite to said piston being rigidly connected to said inner casing, each said peripheral piston having first camming elements, said outer casing having on said closed end on its inner side a second camming element engageable with said first camming elements via a motion conversion mechanism so that sequential movements of said auxiliary pistons are converted into continuous movement of said outer casing in the direction of expansion of said self-contained unit.

11. The apparatus of claim 8 wherein said piezoceramic column consists of a plurality of elementary piezoceramic elements connected in series, each said piezoceramic element consists of a piezoceramic body press-fitted into a ferrule made of a hard material, both faces of said body being ground and polished after grinding for removing a friable surface layer formed as a result of grinding.

* * * * *